Patented June 8, 1954

2,680,728

UNITED STATES PATENT OFFICE 2,680,728

POLYMERS FROM DIHYDRIC PHENOLS AND DISULFONIC ESTERS OF DIOLS

Frank Reeder, Killay, Swansea, Wales, and Eric Richard Wallsgrove, Coventry, England, assignors to Courtaulds Limited, London, England, a British company No Drawing. Application June 29, 1951, Serial No. 234,454

Claims priority, application Great Britain August 4, 1950

5 Claims. (Cl. 260—49)

This invention relates to the production of polymeric compounds, in particular polyethers.

British patent specification No. 433,452 describes a process for the production of synthetic resins containing ether linkages by condensing dinuclear phenols with one or more dihalogeno derivatives of the general formula Hal-X-Hal where Hal represents a halogen atom and X represents $CH_2$ or an aliphatic hydrocarbon chain which is preferably broken by an ether linkage.

The object of the present invention is to produce linear polymers.

According to the present invention, linear polyethers are obtained by reacting substantially equimolecular proportions of a dihydric phenol and a disulphonic ester of a diol in the presence of an alkali in a molecular proportion which is at least twice the molecular proportion of the disulphonic ester.

The alkali is preferably a caustic alkali such as caustic soda. The molecular proportion of the alkali used must be at least twice the molecular proportion of the disulphonic ester but the presence of alkali in excess of this requirement is not detrimental as it has no effect on the nature of the reaction.

The reaction involved in the present invention using caustic soda as the alkali is believed to proceed on the following lines:

$$HO-Ar-O \boxed{\begin{array}{c}H + R'-SO_2-O \\ + NaOH\end{array}} -R- \boxed{\begin{array}{c}-O-SO_2-R' + H \\ + NaOH\end{array}} O-Ar-OH + R'-SO_2 \ldots$$

giving a polymer having the recurring unit $$-[Ar-O-R-O]-$$

together with $R'-SO_2-O-Na$ and $H_2O$. In these formulae Ar is an arylene group, which may be substituted, R is a divalent linkage group and R' is a monovalent hydrocarbon radical such as an alkyl, aryl or aralkyl group. R may be, for example, a group of the type $-(CH_2)_m-$ in which m is an integer not less than 2, preferably from 2 to 10, a group of the type $$-(CH_2)_n-O-(CH_2)_n-$$

in which n is an integer not less than 2, or a group of the type $$-(CH_2)_p-O-\langle\phantom{X}\rangle-O-(CH_2)_p-$$

in which p is an integer not less than 2.

The preferred dihydric phenol is hydroquinone but other dihydric phenols such as resorcinol and 3,3'- or 4,4'-dihydroxy diphenyl may be used.

Examples of suitable disulphonic esters are the di-para-toluene sulphonates of ethylene glycol, 1:4-bis-(β-hydroxyethoxy) - benzene, propane-1,3-diol, butane - 1,4 - diol, pentane - 1,5 - diol, hexane-1,6-diol, decane-1,10-diol and diethylene glycol. Using hydroquinone and the di-para-toluene sulphonate of either ethylene glycol, or 1:4-bis-(β-hydroxyethoxy)-benzene, the polymer in both cases is believed to have the recurring unit $$-[\langle\phantom{X}\rangle-O-CH_2-CH_2-O]-$$

The reaction according to the invention may conveniently be effected by heating the reactants together under a reflux condenser in the presence of a diluent such as a mixture of water and dioxane. The reaction may also be carried out in the presence of an inert gas such as nitrogen to prevent as far as possible oxidative side reactions of the reactants and the product.

The invention is illustrated by the following examples in which parts are by weight.

Example 1

A mixture of 18.5 parts of the di-para-toluene sulphonate of ethylene glycol $$\left(CH_3-\langle\phantom{X}\rangle-SO_2-O-CH_2-CH_2-O-SO_2-\langle\phantom{X}\rangle-CH_3\right)$$

5.5 parts of hydroquinone, 30 parts of dioxane, 20 parts of water and 4 parts of caustic soda was refluxed for 12 hours; during the heating the polymeric ether separated out as a fine white powder. This powder was separated, washed with boiling water and boiling dilute hydrochloric acid and dried at 100° centigrade.

The product was a white powder melting in the temperature range of 240° to 270° centigrade. It was insoluble in the usual organic solvents but dissolved in hot meta-cresol and hot nitrobenzene, partially crystallising out again on cooling. Intrinsic viscosity measurements on the filtered cold meta-cresol solution gave a minimum intrinsic viscosity of 0.20.

Example 2

A mixture of 20.24 parts of the di-para-toluene sulphonate of 1:4-bis-(hydroxyethoxy)-benzene

4.4 parts of hydroquinone, 50 parts of dioxane, 40 parts of water and 6.4 parts of caustic soda (twice the theoretical quantity), was heated at 100° centigrade under a reflux condenser for 23 hours; the mixture was stirred vigorously throughout while a stream of nitrogen was continuously passed through the apparatus both before and during the heating. The product was separated and purified as described in Example 1.

The product was similar to that obtained in Example 1 and had a minimum intrinsic viscosity of 0.24.

Example 3

A mixture of 50.6 parts of the di-para-toluene sulphonate of 1.4-bis-(hydroxyethoxy)-benzene, 11 parts of hydroquinone, 160 parts of dioxane, 58 parts of water and 10 parts of caustic soda (25 per cent excess over the theoretical quantity) were heated under a reflux condenser for 20 hours. The heating was effected under nitrogen as described in Example 2 and the product was separated and purified as described in Example 1.

The product was a pale buff-coloured, fibre-forming polymer melting in the range of 240° to 270° centigrade.

Example 4

A mixture of 11.88 parts of butane 1:4-diol di-para-toluene sulphonate, 3.23 parts of hydroquinone, 50 parts of dioxane, 25 parts of water and 3.58 parts of caustic soda was heated under reflux for 16 hours. The heating was effected under nitrogen as described in Example 2 and the product, a pale brown polymer, was separated and purified as described in Example 1.

Example 5

A mixture of 41.4 parts of the di-para-toluene sulphonic ester of diethylene glycol, 11 parts of hydroquinone, 10 parts of caustic soda (25 percent excess), 58 parts of water and 96 parts of dioxane was heated under a reflux condenser for 12 hours. The product was separated and purified as described in Example 1.

The product was a pale fawn-coloured powder melting at 128° to 136° centigrade; it was completely soluble in meta-cresol and a 1 percent solution at 25° centigrade had an intrinsic viscosity of 0.20.

Example 6

A mixture of 38.4 parts of propane-1:3-diol-di-para-toluene sulphonate, 11 parts of hydroquinone, 96 parts of dioxane, 58 parts of water and 10 parts of caustic soda (25 per cent excess) were heated under a reflux condenser for 12 hours with vigorous stirring, a stream of nitrogen being maintained through the reaction vessel as described in Example 2. The polymeric ether separated as a fawn-coloured powder during the heating. After cooling it was separated, washed with boiling water and boiling dilute hydrochloric acid and dried at 70° centigrade.

The product was a fawn-coloured powder, melting at 155° to 168° centigrade; its intrinsic viscosity was 0.15.

Example 7

A mixture of 41.2 parts of pentane-1:5-diol-di-para-toluene sulphonate, 11 parts of hydroquinone, 96 parts of dioxane, 58 parts of water and 10 parts of caustic soda was heated under a reflux condenser for 12 hours with vigorous stirring, a stream of nitrogen being maintained through the reaction vessel as described in Example 2. The polymeric ether was separated and purified as described in Example 6.

The product was a fawn-coloured powder melting at 134° to 164° centigrade; its intrinsic viscosity was 0.17.

Example 8

A mixture of 42.6 parts of hexane-1:6-diol-di-para-toluene sulphonate, 11 parts of hydroquinone, 96 parts of dioxane, 58 parts of water and 10 parts of caustic soda (25 per cent excess) was heated under a reflux condenser for 12 hours with vigorous stirring, a stream of nitrogen being maintained through the reaction vessel as described in Example 2. The polymeric ether was separated and purified as described in Example 6.

The product was a pale fawn-coloured powder, melting at 165° to 170° centigrade; its intrinsic viscosity was 0.18.

Example 9

A mixture of 14.46 parts of decane-1:10-diol-di-para-toluene sulphonate, 3.3 parts of hydroquinone, 58 parts of dioxane, 18 parts of water and 3 parts of caustic soda (25 per cent excess) was heated under a reflux condenser for 12 hours with vigorous stirring, a stream of nitrogen being maintained through the reaction vessel as described in Example 2. The polymeric ether was separated and purified as described in Example 6.

The product was a brown solid, melting below 100° centigrade.

In the above examples, intrinsic viscosity $\eta_i$ is determined by the formula $$\eta_i = \frac{\log_e \frac{t_1}{t_2}}{c}$$

where $t_1$ is the time for a solution of the polymer in meta-cresol (concentration $c$ grams in 100 grams of meta-cresol) using a standard Ostwald viscometer, and $t_2$ is the corresponding time for meta-cresol alone.

What we claim is:

1. A process for the production of linear polyethers which comprises mixing together to form a solution, substantially equimolecular proportions of a dihydric phenol which apart from its hydroxyl groups is unsubstituted, and an aromatic disulphonic ester of a diol having the general formula HO—(CH$_2$)$_m$—OH, in which $m$ is an integer not less than 2, together with an aqueous diluent and a caustic alkali, the molecular proportion of which is at least twice the molecular proportion of the disulphonic ester, heating the solution so formed at the refluxing temperature of the aqueous diluent; whereby a linear polyether is precipitated and separating the polymeric ether so precipitated.

2. A process as claimed in claim 1, wherein the dihydric phenol used is hydroquinone.

3. A process as claimed in claim 1, wherein the disulphonic ester used is the di-para-toluene sulphonate of ethylene glycol.

4. A process as claimed in claim 1, wherein the aqueous diluent used is a mixture of water and dioxane.

5. A process for the production of linear polyethers which comprises mixing together to form a solution, substantially equimolecular proportions of hydroquinone and the di-para-toluene sulphonate of ethylene glycol, together with aqueous dioxane as diluent, and a caustic alkali, the molecular proportion of which is at least twice the molecular proportion of the di-para-toluene sulphonate of ethylene glycol, heating the solution so formed at the refluxing temperature of the aqueous dioxane; whereby a linear polyether is precipitated, and separating the polymeric ether so precipitated.

References Cited in the file of this patent

UNITED STATES PATENTS

| Number | Name | Date |
|---|---|---|
| 2,060,715 | Arvin | Nov. 10, 1936 |

OTHER REFERENCES

Karrer: Organic Chemistry, 2nd English edition (1946), page 413; Elsevier Pub. Co., New York.